(12) United States Patent
O'Shea (10) Patent No.: US 8,099,826 B2
(45) Date of Patent: Jan. 24, 2012

(54) MATERIAL RECOVERY SYSTEM

(75) Inventor: Mark O'Shea, Dublin (IE)

(73) Assignee: Lifestyle Foods, Dublin (IE)

( * ) Notice: Subject to any disclaimer, the term of this patent is extended or adjusted under 35 U.S.C. 154(b) by 698 days.

(21) Appl. No.: 12/097,915

(22) PCT Filed: May 9, 2006

(86) PCT No.: PCT/IE2006/000055
§ 371 (c)(1),
(2), (4) Date: Oct. 14, 2008

(87) PCT Pub. No.: WO2006/120661
PCT Pub. Date: Nov. 16, 2006

(65) Prior Publication Data
US 2009/0044367 A1 Feb. 19, 2009

(30) Foreign Application Priority Data
May 10, 2005 (IE) .................................. S2005/0297

(51) Int. Cl.
*A47L 5/14* (2006.01)
(52) U.S. Cl. .......................................... 15/345; 15/418
(58) Field of Classification Search ............ 15/345–347, 15/309.1, 304, 418, 405, 409; 209/31, 32; 141/67; 34/72, 92, 168
See application file for complete search history.

(56) References Cited

U.S. PATENT DOCUMENTS

| | | | |
|---|---|---|---|
| 345,610 A | 7/1886 | Wood |
| 862,695 A | 8/1907 | Baldwin |
| 2,939,408 A | 6/1960 | Greenberg |
| 3,078,496 A | 2/1963 | Doran et al. |
| 3,166,004 A | 1/1965 | Fries |

(Continued)

FOREIGN PATENT DOCUMENTS
EP 0679849 11/1995
(Continued)

OTHER PUBLICATIONS

International Search Report and Written Opinion, PCT/IE2006/000055, Aug. 23, 2006.

*Primary Examiner* — Dung Van Nguyen
(74) *Attorney, Agent, or Firm* — Baker Donelson Bearman Caldwell & Berkowitz, PC (57) ABSTRACT

A powdery material removal and recovery system comprises a distribution apparatus (1), a blower unit (2), a vacuum unit (3), a recovered powder receiving hopper (4), a powder sifter (5) and a conveyor (6). The vacuum unit (3) sucks material particles from the surface of boards passing along conveyor (6) below and transfers the material to receiving hopper (4). Air from the blower unit (2) is expelled through a pressure chamber of the distribution apparatus (1) onto the surface of the boards below so that any remaining remnants of particles are dried and dislodged and can then be removed via the outer duct compartments (108, 110). Recovered material deposited into the receiving hopper (4) may then be transferred to the powder sifter (5) for sifting and reuse.

31 Claims, 5 Drawing Sheets

U.S. PATENT DOCUMENTS

| | | | |
|---|---|---|---|
| 3,177,822 A | 4/1965 | Archer et al. | |
| 3,775,806 A | 12/1973 | Olbrant et al. | |
| 4,044,420 A | 8/1977 | Hanson et al. | |
| 4,403,365 A | 9/1983 | Hanson et al. | |
| 4,594,748 A * | 6/1986 | Warfvinge | 15/308 |
| 4,636,301 A | 1/1987 | Laramore et al. | |
| 4,670,936 A | 6/1987 | Hanson et al. | |
| 4,773,168 A * | 9/1988 | Lamos et al. | 34/554 |
| 4,778,365 A | 10/1988 | Archer et al. | |
| 5,146,868 A * | 9/1992 | Kirk | 118/713 |
| 5,457,847 A * | 10/1995 | Uzawa et al. | 15/345 |
| 6,230,360 B1 | 5/2001 | Singleton | |
| 7,111,797 B2 * | 9/2006 | Bezama et al. | 239/522 |

FOREIGN PATENT DOCUMENTS

| | | |
|---|---|---|
| EP | 1249169 | 10/2002 |

\* cited by examiner

FIGURE 4

MATERIAL RECOVERY SYSTEM

This application claims the benefit of PCT/IE2006/000055, filed 9 May 2006 and of Ireland patent application number S2005/0297, filed 10 May 2005.

TECHNICAL BACKGROUND

The present invention relates to a system for dislodging and removing powdery residues from handling and conveying systems.

BACKGROUND ART

In the manufacture of certain edible products such as bread and the like, dough is placed onto a board and is left in a proving chamber for a specific time to prove. Prior to receiving the dough, the boards, which are sometimes referred to as "peel-boards", are pre-sprinkled with a powdery material, such as semolina flour, in order to assist the eventual release of the dough. After the removal of the dough, residual semolina flour remains on the peel-boards. It is normal practice to remove this flour using a vacuum system. However experience has shown that removal and recovery of the flour is often incomplete as some flour may remain adhered to the board due to ambient humidity, the moisture of the dough or moisture generated over the proving process, which typically has a duration of 2-6 hours.

It is therefore an object of the invention to alleviate the disadvantages associated with the prior art.

SUMMARY OF THE INVENTION

Accordingly, the present invention provides a powdery material removal and recovery means comprising a distribution head having vacuum means for drawing material from a surface by suction and for transferring the material to at least two recovery chambers and onwards to a recovery hopper and an air distribution means for directing air onto the surface via a pressure chamber to assist in the removal of the powdery material by the vacuum means, the recovery chambers and the pressure chamber formed by spaced apart baffles extending from a position level with an upper edge of a top opening to a position level with a lower edge of a bottom opening of said distribution head.

In another aspect, the present invention provides a powdery material removal and recovery apparatus, comprising a distribution head with sealed edges and a pair of interior spaced-apart baffles that define a pressure chamber and a pair of recovery chambers in opposing relation lateral of the pressure chamber, the baffles extending from a position level with an upper edge of a top opening to a position level with a lower edge of a bottom opening of the distribution head. An inwardly tapered funnel-shaped lower section of the distribution head forms a restricted nozzle opening at the bottom which nozzle opening communicates with the recovery chamber and with the pressure chamber. A vacuum means provides for drawing material from a surface by suction and for transferring the material to the pair of recovery chambers and onwards to a recovery hopper. An air distribution means provides for directing air onto the surface via the pressure chamber to assist in the removal of the powdery material by the vacuum means. Means provides for positioning the distribution head selectively relative to the surface.

In another aspect, the present invention provides a powdery material removal and recovery apparatus comprising a distribution head having vacuum means for drawing material from a surface by suction and for transferring the material to a recovery chamber and onwards to a recovery hopper and an air distribution means for directing air onto the surface via a pressure chamber to assist in the removal of the powdery material by the vacuum means, and an adjustable bracket to which the distribution head mounts, the adjustable bracket operable to allow altering a clearance between the distribution head and the surface.

In another aspect, the present invention provides a powdery material removal and recovery apparatus comprising a distribution head having vacuum means for drawing material through a bottom opening from a surface by suction and for transferring the material to a recovery chamber and onwards to a recovery hopper and an air distribution means for directing air onto the surface via a pressure chamber having a bottom opening to assist in the removal of the powdery material by the vacuum means, the distribution head comprises an inwardly tapered funnel-shaped lower section that forms a restricted nozzle opening at the bottom, and a base plate covering the nozzle opening in the distribution head and having a plurality of slots arranged in spaced apart rows so that the respective bottom openings of the distribution head chambers are reduced in aperture.

In another aspect, the present invention provides a powdery material removal and recovery apparatus comprising a distribution head having vacuum means for drawing material through a bottom opening from a surface by suction and for transferring the material to a recovery chamber and onwards to a recovery hopper and an air distribution means for directing air onto the surface via a pressure chamber having a bottom opening to assist in the removal of the powdery material by the vacuum means, and a removable lid that comprises a depending skirt around its edges that forms a lip so that when positioned on the distribution head, an inner surface of the lip contacts a respective coincident outer edge of the distribution head to form a seal, and the lid includes means for connecting suction or pressuring means to the recovery chamber and the pressure chamber respectively.

DETAILED DESCRIPTION

As discussed in detail below, the present invention provides a powdery material removal and recovery means comprising a distribution head having vacuum means for drawing material from a surface by suction and for transferring the material to a recovery chamber and onwards to a recovery hopper and an air distribution means for directing air onto the surface via a pressure chamber to assist in the removal of the powdery material by the vacuum means.

Typically, the surface is that of a receiver such as a board, and the board travels on a conveyor located beneath the distribution head. In use, the recovery chamber and the pressure chamber are located transverse to the surface of the board in the direction of relative travel between the distribution head and the board.

Preferably the board comprises a peel-board.

Ideally the distribution head of the recovery means comprises at least two recovery chambers.

Conveniently, the distribution head comprises a boxed channel section with sealed edges and is open at the top and bottom.

Advantageously, the distribution head comprises an inwardly tapered funnel-shaped lower section that forms a restricted nozzle opening at the bottom.

Preferably, the at least two recovery chambers of the distribution head formed by spaced apart baffles extending from a position level with the upper edge of the top opening of the distribution head to a position level with the lower edge of the bottom opening of said distribution head.

In a preferred arrangement, the pressure chamber is formed by a baffle extending from a position level with the upper edge of the top opening to a position level with the lower edge of the bottom opening of said distribution head.

Preferably, the pressure chamber is located between the two recovery chambers.

Ideally, the bottom opening of the distribution head is covered by a base plate having a plurality of slots arranged in spaced apart rows so that the respective bottom openings of the distribution head chambers are reduced or restricted in aperture.

The distribution head guides pressurised air onto the surface of a board in order to disturb loose powdery material residing on the board surface and to dislodge any material that may be adhered to the board surface. This assists the removal of all powdery residues and clumped material from the board surface to the recovery chamber or chambers. Blowing pressurised air on to the board also facilitates the drying of any damp powdery material on the board which further assists its removal from the board surface by the vacuum means.

Upon removal of the floury residues, the boards are available for re-use. Prior to receiving new dough for proving, boards may be re-sprinkled with sifted semolina which can be fresh material or material recovered from the hopper. The removal of clumped powder clusters from the previous cycle and the provision of a freshly sprinkled coating of semolina on the boards ensures that bread products are consistently and easily removable from the boards and are produced with smooth surfaces free of clumped baked-on semolina flour.

Advantageously, the distribution head is mounted adjacent the board by an adjustable bracket which allows the clearance between the distribution head and the board surface to be altered.

In a preferred arrangement the distribution head includes a removable lid. This provides access to interior duct compartments of the distribution head for cleansing and maintenance purposes.

The removable lid is ideally provided with a depending skirt that forms a lip sized so that when positioned on the distribution head, the inner surfaces of the lip contact the coincident outer edges of the distribution head to form a seal.

The invention also provides a dough handling system incorporating the material removal and recovery means described above.

The invention will now be described more particularly with reference to the accompanying drawings, in which are shown, by way of example only, one embodiment of a material recovery system according to the invention.

Figure 1:
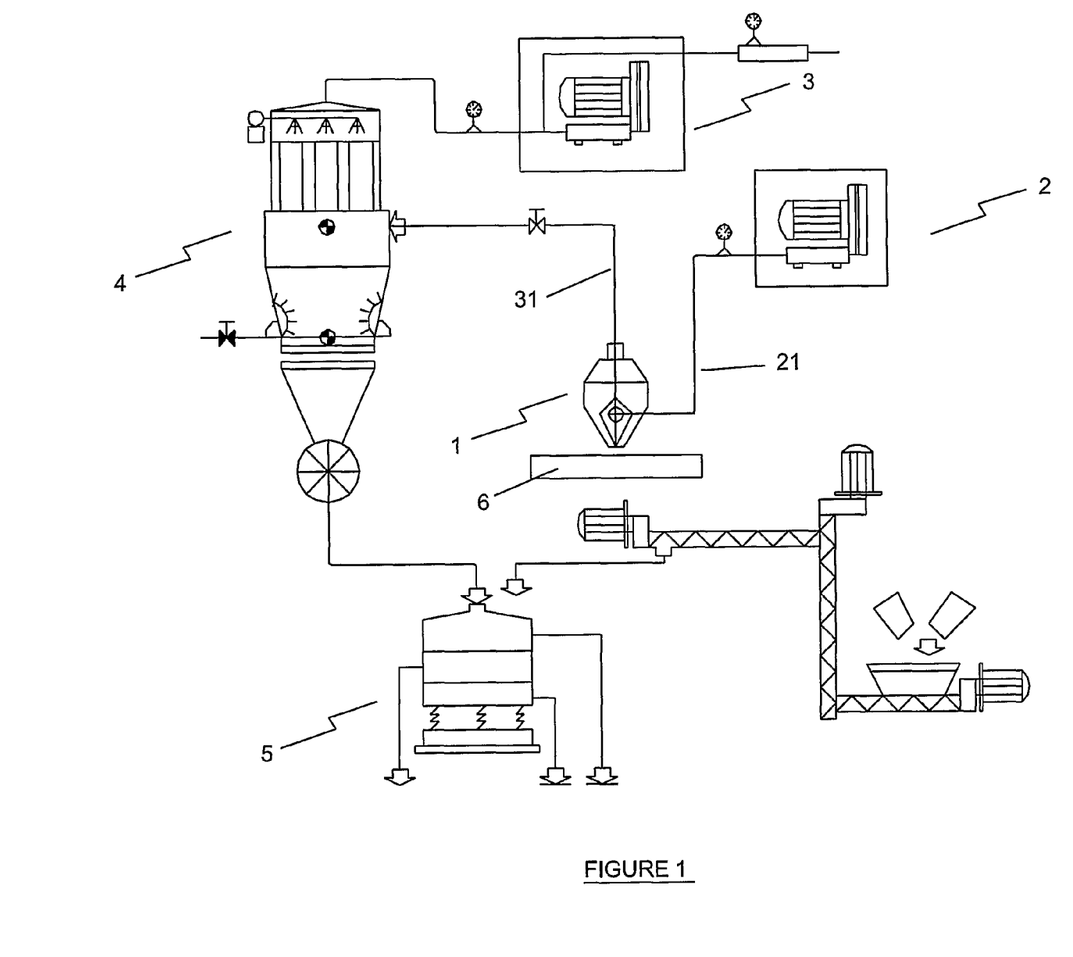
FIG. 1 is a schematic diagram of a recovery system embodying the invention.

Referring initially to FIG. 1, a powdery material removal and recovery means according to the invention comprises a distribution apparatus 1, a blower unit 2, a vacuum unit 3, a recovered powder receiving hopper 4, a powder sifter 5 and a conveyor 6. In this example, the powdery material is semolina flour, but it will be appreciated that the system may equally be employed with other powdery substances. The distribution apparatus includes a distribution head 100, a removable lid 200, a base plate 300 and a mounting (system) bracket 400.

Figure 2A:
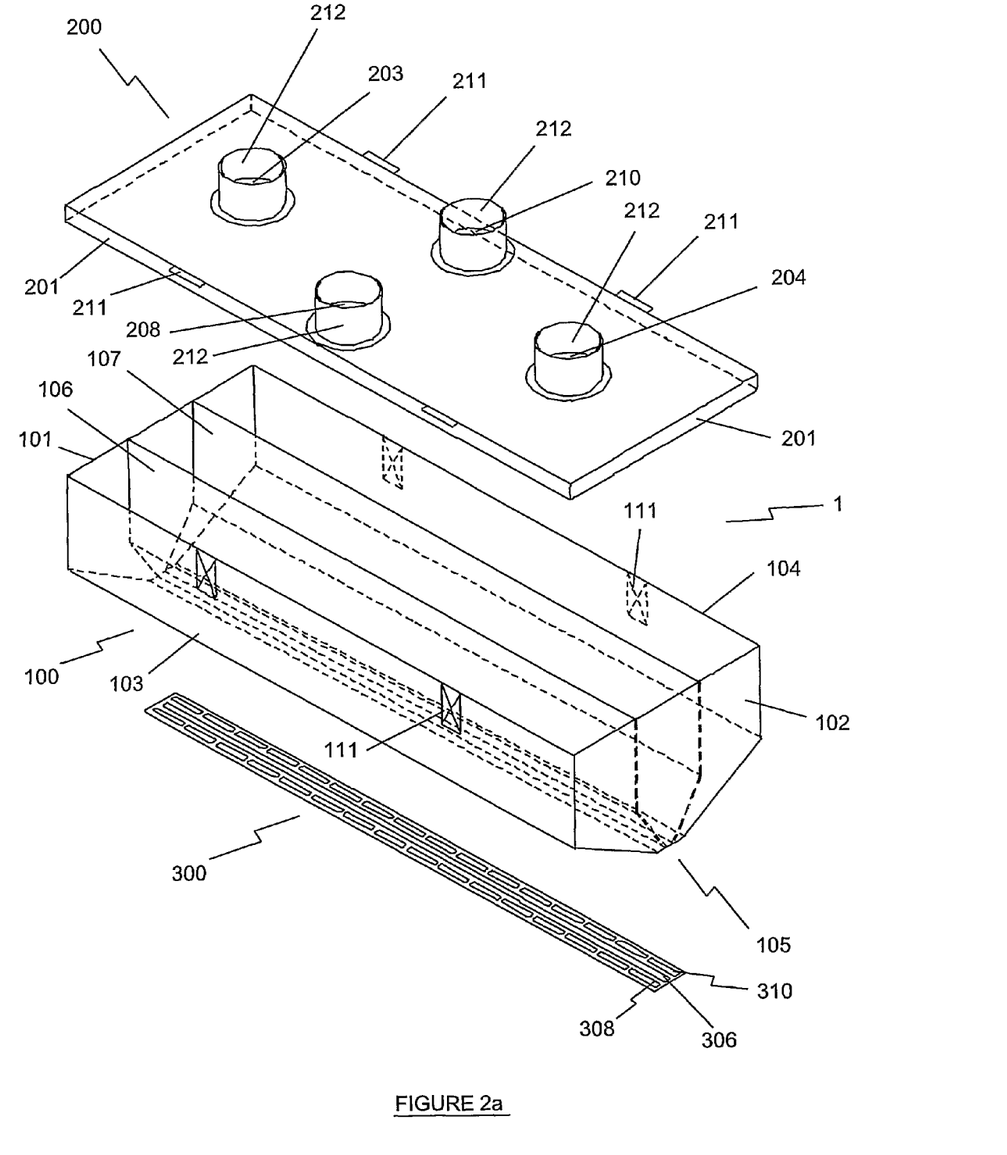
FIG. 2a is an exploded view of a distribution head of the recovery system of FIG. 1.

The distribution head 100 comprises a container having two substantially spaced apart parallel end walls 101, 102 and two spaced apart parallel side walls 103, 104. Each side wall 103, 104 is formed from an initially flat rectangular stainless steel sheet that is bent in a straight line along its length to create two flat sections such that an upper flat section which may be placed substantially vertically with a lower flat section being angled obtusely inwardly. Positioning the two side walls 103, 104 in this manner and connecting them to the end walls 101, 102 provides a boxed channel section with sealed edges that is open at the top and has an inwardly tapered funnel-shaped lower section that forms a substantially rectangular restricted nozzle opening 105 at the bottom.

Figure 2B:
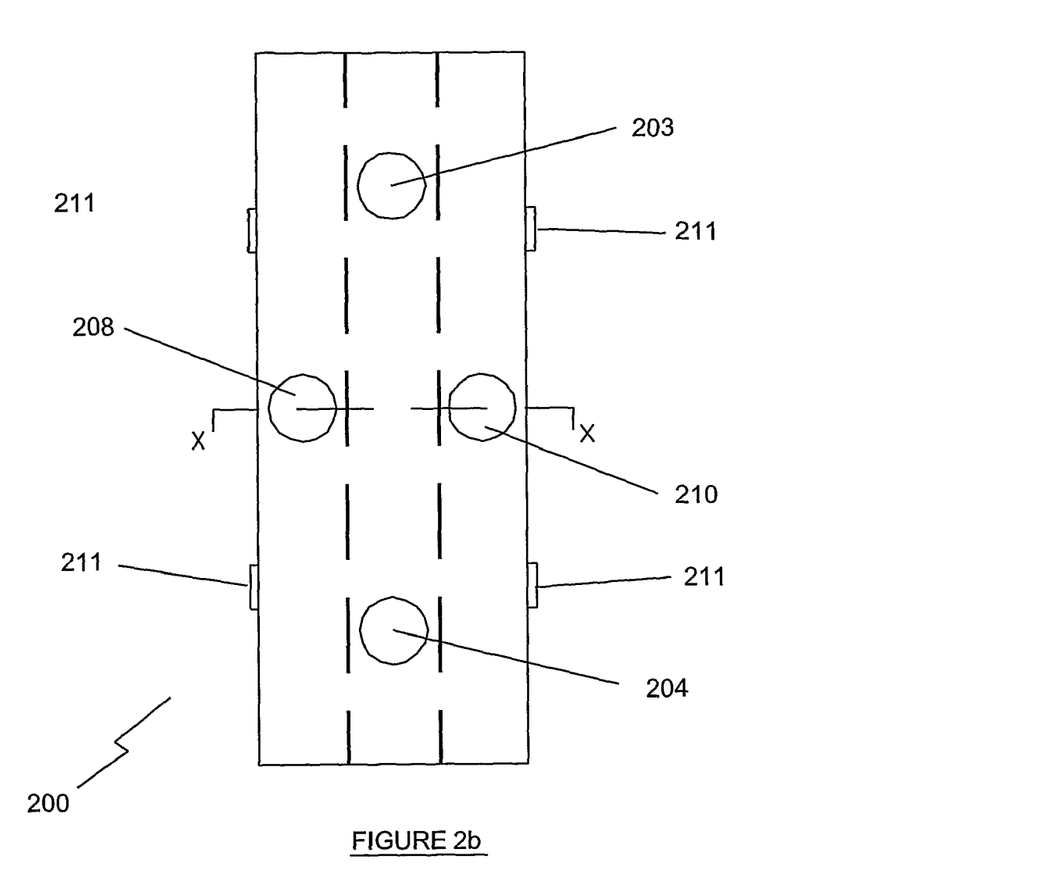
FIG. 2b is a plan view from above of the distribution head.
Figure 2C:
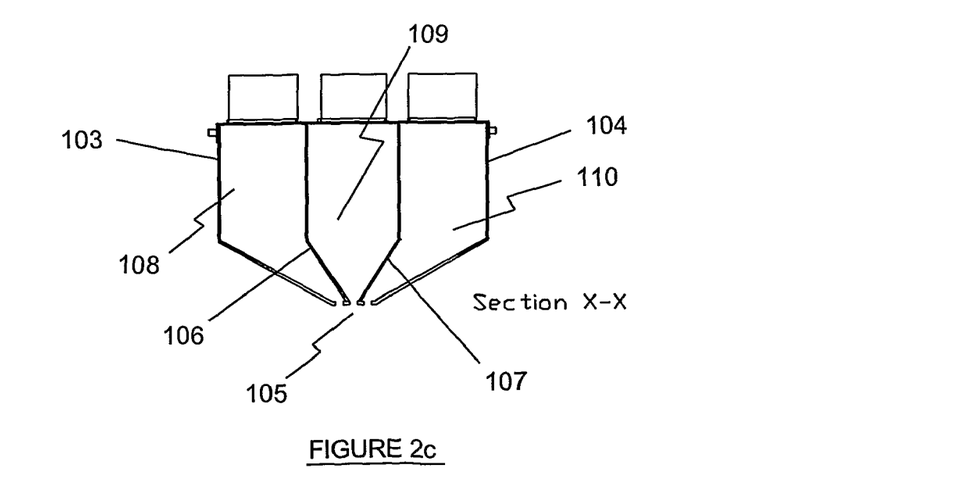
FIG. 2c is a sectional elevation of the distribution head.

Referring to FIG. 2c, within the confines of the distribution head walls three separate duct compartments 108, 109 and 110 are formed by the provision of two spaced apart baffles 106, 107 that are attached perpendicularly at each end to the end walls and that extend from a position level with the upper edge of the top opening to a position level with the lower edge of the bottom opening 105. The bottom nozzle opening 105 is thus divided into three separate parallel narrow elongate orifices. The central compartment 109 is a pressure chamber and the outer compartments 108 and 110 are vacuum chambers. The baffles 106, 107 are formed using the same process used for the side walls described herein. However, the lower inwardly bent sections of the baffles are at a shallower angle than those of the side walls. The vertical upper sections of the baffles are spaced parallel to the side walls 103, 104.

Referring to FIGS. 2a and 2b, a substantially rectangular removable lid 200 is constructed from sheet stainless steel material and has a depending skirt that forms a lip 201 that extends downwardly around its entirety. When positioned over the top opening of the distribution head 100 the underside of the lid rests on the upper edges of the distribution head walls 101, 102, 103, 104 and the baffles 106, 107 and the inner surfaces of the lip 201 contact the coincident outer edges of the distribution head walls to form a seal. Fastening of the lid to the distribution head 100 is achieved using a plurality of draw clamp latches 111 mounted to the distribution head side walls 103, 104 that engage with corresponding latch keepers 211 connected to the outer surface of the lip 201.

The lid has four circular holes arranged to provide two pressurized air inlet ports 203, 204 for compartment 109, a vacuum outlet port 208 to compartment 108 and a vacuum outlet port 210 to compartment 110. Bolted directly about the bore of each hole is a cylindrical and flanged pipe tail section 212 that protrudes upwards from the lid upper surface to facilitate connection to conduits that carry air or vacuum pressure to the respective compartments. Connection of the conduits to the pipe tail sections may be made using jubilee clips or other suitable removable fasteners. Typically, the conduits will be constructed as a flexible hose with clamps or clips provided to connect the hose to a pipe tail section.

Figure 3A:
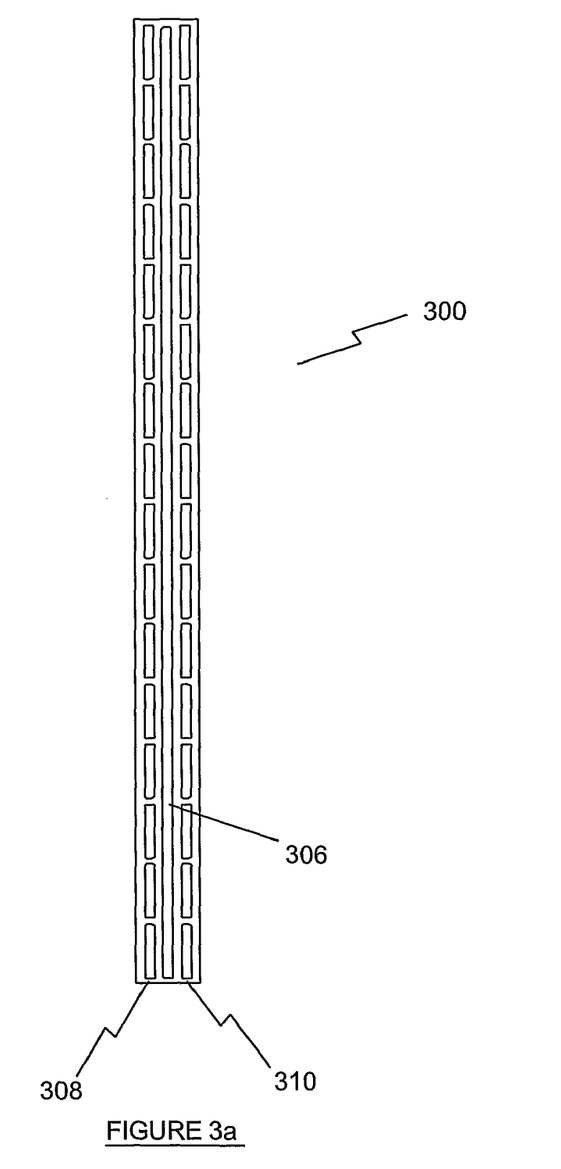
FIGS. 3a and 3b are a plan view and an end elevation respectively of a base plate of the distribution head.
Figure 3B:
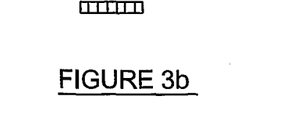

Referring to FIGS. 3a and 3b, the base plate 300 comprises a covering that fits flush over the bottom nozzle opening 105 of the distribution head when connected by welding to the lower edges of end walls 101, 102 and side walls 103, 104. It comprises a flat elongate stainless steel sheet that contains a plurality of substantially rectangular slots arranged in two spaced apart rows 308, 310, each row being provided to either side of, and parallel to, a single long central slot 306 as shown. The spacing between the rows and the central slot is of a sufficient distance such that connection of the base plate to the bottom ends of the baffles 106, 107 can be made. The central slot 306 of the base plate reduces the aperture of the central orifice of the nozzle opening 105 that corresponds to central compartment 109. Rows 308 and 310 restrict the outer orifices of the nozzle 105 that correspond to the outer compartments 108 and 110 respectively. In one embodiment the slots of rows 308 and 310 are approximately 45 mm in length and 8 mm in width with an end-to-end spacing of approximately 5 mm. Other dimensions will be suitable and selected for other systems.

Figure 4:
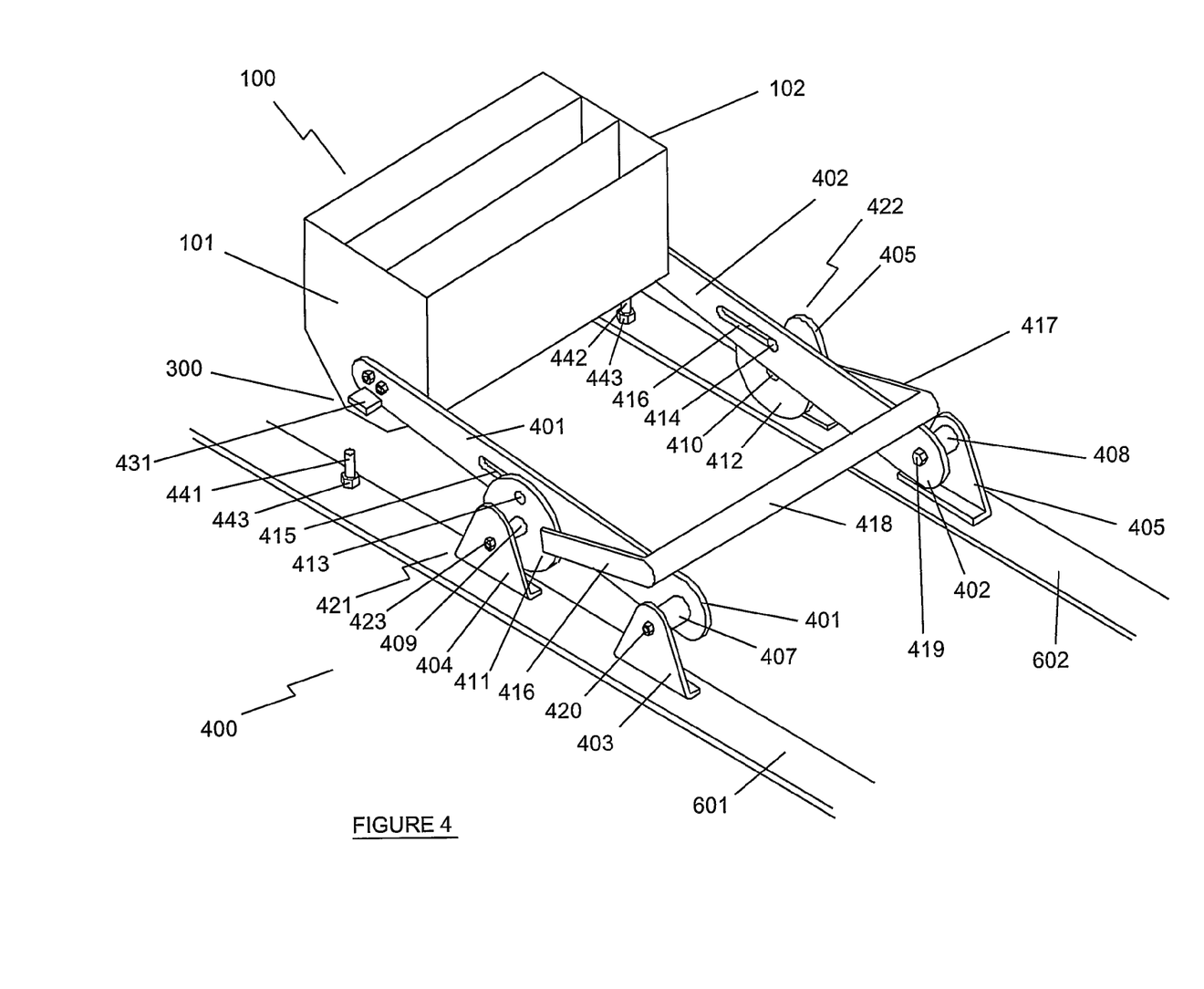
FIG. 4 is an isometric illustration of the adjustable bracket and the distribution head.

Referring to FIG. 4, the distribution head 100 is mounted on a bracket 400 that comprises two spaced apart arms 401, 402 hinged at their distal ends and each pivotally mounted on a pivoting mechanism 421, 422, respectively, such that the clearance between the distribution head base plate 300 and the conveyor 6 can be adjusted upon actuation of a handle bar 418 that extends between levers 416, 417 that are connected to the respective pivoting mechanism of each arm.

The respective proximal ends of the arms 401, 402 are each connected by a plurality of bolts to the lower sections of the distribution head end walls 101, 102. The arms each extend from the distribution head towards distal upright members 403, 405 which are each bolted at their bases to outer rails 601, 602 of a conveyor system frame. Pins 407, 408, each provided with an axially aligned threaded hole at one end and an axially aligned threaded shank at the other, extend between the respective arms 401, 402 and upright members 403, 405. Connection of the arms 401, 402 to the pins 407, 408 is effected by bolts 419 that extend through apertures in the arms 401, 402 to engage with the threaded holes of the pins 407, 408, respectively. The threaded shanks of the pins 407, 408 each extend through apertures provided through the upright members 403, 405, respectively, and are fastened at their free ends by lock-nuts 420. In this arrangement, upright members 403, 405 and pins 407, 408, provide a hinge mechanism whereby the arms 401, 402 raise and lower the distribution head 100.

Control over the raising and lowering of the distribution head 100 is facilitated by mechanisms 421, 422, each connected to the respective arms at a position intermediate the proximal and distal ends. Referring to mechanism 421 operating on the arm 401, an upright member 404, bolted at its base to the outer rail 601 of the conveyor system frame, supports a fulcrum pin 409. The pin 409, which is secured at its outer end by a lock-nut 423, extends inwardly to contact a disk 411 such that their respective axes are in alignment. A bolt (not shown) extending through an aperture formed in the rear of the disk 411 and engaging with an axially threaded hole that is provided at the inner end of the pin 409, fastens the disk 411 and pin 409 together. A second pin 413, radially off-set from pin 409, extends from the disk 411 through a slot 415 that is provided through the arm 401. The pin 413, which has threaded ends, is secured at both ends by hexagonal nuts (not shown) and the mechanism is assembled such that when positioned through the most distal end of the slot 415, the central axis of pin 413 lies vertically above the central axis of pin 409, as shown in FIG. 4. In this configuration the distribution head 100 is raised to its highest position and the lever 416 extends distally from the disk 411 to which it is connected at an angle such that the underside of the handle bar 418, which spans perpendicularly across the conveyor system to connect with lever 417 on the opposing side, is clear of the arms 401, 402 below. Connection of the lever 416 to the disk 411 is effected by welding.

To lower the distribution head, an operator raises the handle bar 418 so that the inertia of the mechanism is overcome and the disks 411, 412 rotate about fulcrum pins 409 and 410, respectively. The rotation of the disks imparts motion to the off-set pins 413, 414 which is translated into forward and downward motion components by the slots 415 and 416, along which the pins 413, 414 are able to slide, respectively. In turn, this moves the arms 401, 402 downwards thus lowering the distribution head. Lugs 431, 432 projecting from arms 401, 402, respectively, prevent the distribution head from descending below a predetermined working height, determined by pillars 441, 442 upon which the lugs impinge. The pillars 441, 442, which are height-adjustable, have threaded proximal ends. Each pillar 441, 442 is connected to the conveyor system frame by an upper nut and a lower lock-nut (only upper nuts 443 are shown) that are located above and below the outer rails 601, 602 of the conveyor system frame, respectively. By altering the position of the upper nuts 443 along the pillars 441, 442, the height to which the pillars 441, 442 extend above the surface of the outer rails 601, 602 may be varied. By using the lower lock-nuts (not shown) to fasten the pillars 441, 442 to the underside of the outer rails 601, 602, the desired height is thus locked in position.

The use of the apparatus for removing powdery residue, such as semolina flour, will now be described.

The blower unit 2 is connected via a conduit 21 to the inlet ports 203, 204 of the central chamber 109 of the distribution head 100. A vacuum unit 3 is connected, via a recovered semolina receiving hopper 4, by a conduit 31 to the outlet ports 208, 210 of the outer chambers 108 and 110 respectively. The distribution head is mounted by a bracket 400 so as to be positioned upright above a conveyor 6 that conveys peel-boards. The distribution head is mounted such that the base plate 103 is oriented transversely across a longitudinal axis of the peel-boards in the direction of travel of the conveyor and is situated at a distance of ideally less than 10 mm from the surface of the peel-boards below. With the vacuum unit in operation, semolina flour is vacuumed from the entire surface of the peel-boards as they travel on the conveyor through the outer slots 308, 310 of the base plate 300 into the outer chambers of the distribution head. From these chambers the flour is sucked further through the outlet ports 208, 210 via conduit 31 to the remotely located recovered semolina receiving hopper 4. Simultaneously with the vacuuming operation, air from the blower 2 unit enters the central chamber of the distribution head and is ducted downwards towards the nozzle opening 105 at the bottom. The pressurised air is expelled through the central slot 306 of the base plate 300. The pressurised air impinges on the peel-board surface and dislodges any remnants of flour that may be remaining. For more complete flour recovery, these disturbed particles are vacuumed into the outer chambers of the distribution head and up to the recovered semolina receiving hopper as previously described.

While the system has been described such that the distribution head 100 is in a fixed position so as to remove powder from the boards passing beneath it on a conveyor, it will be appreciated that other configurations are possible. For example, the distribution head may be located on a carriage which acts to move the distribution head over stationary or moving boards. Additionally, any desired number of vacuum chambers may be provided.

It will of course, be understood that the invention is not limited to the specific details described herein, which are given by way of example only and that various modifications and alterations are possible within the scope of the invention as defined in the appended claims.

The invention claimed is:

1. A powdery material removal and recovery apparatus comprising a distribution head having vacuum means for drawing material from a surface by suction and for transferring the material to at least two recovery chambers and onwards to a recovery hopper and an air distribution means for directing air onto the surface via a pressure chamber to assist in the removal of the powdery material by the vacuum means, the recovery chambers and the pressure chamber formed by spaced-apart baffles extending from a position level with an upper edge of a top opening to a position level with a lower edge of a bottom opening of said distribution head.

2. The powdery material removal and recovery apparatus as claimed in claim 1, wherein the recovery chambers and the pressure chamber are located transverse to a board in the direction of relative travel between the distribution head and the board.

3. The powdery material removal and recovery apparatus as claimed in claim 2, wherein the distribution head comprises an inwardly tapered funnel-shaped lower section that forms a restricted nozzle opening at the bottom.

4. The powdery material removal and recovery apparatus as claimed in claim 3, wherein the nozzle opening of the distribution head is covered by a base plate having a plurality of slots arranged in spaced apart rows so that the respective bottom openings of the distribution head chambers are reduced in aperture.

5. The powdery material removal and recovery apparatus as claimed in claim 2, wherein the distribution head is mounted adjacent the surface by an adjustable bracket which allows the clearance between the distribution head and the board surface to be altered.

6. The powdery material removal and recovery apparatus as claimed in claim 2, wherein the distribution head includes a removable lid.

7. The powdery material removal and recovery apparatus as claimed in claim 6, wherein the removable lid comprises a depending skirt around its edges that forms a lip so that when positioned on the distribution head, the inner surfaces of the lip contact the coincident outer edges of the distribution head to form a seal, and the lid includes means for connecting suction or pressuring means to the recovery chamber and the pressure chamber respectively.

8. The powdery material removal and recovery apparatus as claimed in claim 1, wherein the distribution head comprises an inwardly tapered funnel-shaped lower section that forms a restricted nozzle opening at the bottom.

9. The powdery material removal and recovery apparatus as claimed in claim 8, wherein the nozzle opening of the distribution head is covered by a base plate having a plurality of slots arranged in spaced apart rows so that the respective bottom openings of the distribution head chambers are reduced in aperture.

10. The powdery material removal and recovery apparatus as claimed in claim 1, wherein the distribution head comprises a boxed channel section with sealed edges.

11. The powdery material removal and recovery apparatus as claimed in claim 1, wherein the pressure chamber is located between the two recovery chambers.

12. The powdery material removal and recovery apparatus as claimed in claim 1, wherein the distribution head is mounted adjacent the surface by an adjustable bracket which allows the clearance between the distribution head and the board surface to be altered.

13. The powdery material removal and recovery apparatus as claimed claim 1, wherein the distribution head includes a removable lid.

14. The powdery material removal and recovery apparatus as claimed in claim 13, wherein the removable lid comprises a depending skirt around its edges that forms a lip so that when positioned on the distribution head, the inner surfaces of the lip contact the coincident outer edges of the distribution head to form a seal, and the lid includes means for connecting suction or pressuring means to the recovery chamber and the pressure chamber respectively.

15. A powdery material removal and recovery apparatus, comprising:
a distribution head with sealed edges and a pair of interior spaced-apart baffles that define a pressure chamber and a pair of recovery chambers in opposing relation lateral of the pressure chamber, the baffles extending from a position level with an upper edge of a top opening to a position level with a lower edge of a bottom opening of the distribution head, an inwardly tapered funnel-shaped lower section of the distribution head forms a restricted nozzle opening at the bottom which nozzle opening communicates with the recovery chamber and with the pressure chamber;
vacuum means for drawing material from a surface by suction and for transferring the material to the pair of recovery chambers and onwards to a recovery hopper;
air distribution means for directing air onto the surface via the pressure chamber to assist in the removal of the powdery material by the vacuum means; and
means for positioning the distribution head selectively relative to the surface.

16. The powdery material removal and recovery apparatus as recited in claim 15, wherein the distribution head is disposed so that a longitudinal axis of the nozzle opening in the bottom is transverse to a direction of relative travel between the distribution head and the surface.

17. The powdery material removal and recovery apparatus as claimed in claim 15, wherein the bottom opening of the distribution head is covered by a base plate having a plurality of slots arranged in spaced apart rows so that the respective bottom openings of the pressure chamber and the vacuum chambers of the distribution head are reduced in aperture relative to an inlet for the pressure chamber and an outlet for the recovery chambers.

18. The powdery material removal and recovery apparatus as claimed in claim 15, wherein means for positioning the distribution head comprises an adjustable bracket that allows the clearance between the distribution head and the board surface to be altered.

19. The powdery material removal and recovery apparatus as claimed in claim 15, wherein the distribution head includes a removable lid that comprises a depending skirt around its edges that forms a lip so that when positioned on the distribution head, the inner surfaces of the lip contact the coincident outer edges of the distribution head to form a seal, and the lid includes means for connecting suction to the recovery chambers and pressuring means to the pressure chamber.

20. A powdery material removal and recovery apparatus comprising a distribution head having vacuum means for drawing material from a surface by suction and for transferring the material to a recovery chamber and onwards to a recovery hopper and an air distribution means for directing air onto the surface via a pressure chamber to assist in the removal of the powdery material by the vacuum means, and an adjustable bracket to which the distribution head mounts, the adjustable bracket operable to allow altering a clearance between the distribution head and the surface.

21. The powdery material removal and recovery apparatus as claimed in claim 20, wherein the distribution head comprises an inwardly tapered funnel-shaped lower section that forms a restricted nozzle opening at the bottom.

22. The powdery material removal and recovery apparatus as claimed in claim 21, wherein the nozzle opening of the distribution head is covered by a base plate having a plurality of slots arranged in spaced apart rows so that the respective bottom openings of the distribution head chambers are reduced in aperture.

23. The powdery material removal and recovery apparatus as claimed in claim 20, further comprising a baffle in the distribution head which forms the recovery chamber and the pressure chamber, the baffle extending from a position level with an upper edge of a top opening to a position level with a lower edge of a bottom opening of the distribution head.

24. A powdery material removal and recovery apparatus comprising a distribution head having vacuum means for drawing material through a bottom opening from a surface by suction and for transferring the material to a recovery chamber and onwards to a recovery hopper and an air distribution means for directing air onto the surface via a pressure chamber having a bottom opening to assist in the removal of the powdery material by the vacuum means, the distribution head comprises an inwardly tapered funnel-shaped lower section that forms a restricted nozzle opening at the bottom, and a base plate covering the nozzle opening in the distribution head and having a plurality of slots arranged in spaced apart rows so that the respective bottom openings of the distribution head chambers are reduced in aperture.

25. The powdery material removal and recovery apparatus as recited in claim 24, wherein the distribution head comprises a boxed channel section with sealed edges.

26. The powdery material removal and recovery apparatus as recited in claim 24, further comprising a baffle extending from a position level with an upper edge of a top opening to a position level with a lower edge of a bottom opening of said distribution head to form the recovery chamber and the pressure chamber in the distribution head.

27. The powdery material removal and recovery apparatus as recited in claim 24, further comprising a removable lid that comprises a depending skirt around its edges that forms a lip so that when positioned on the distribution head, an inner surface of the lip contacts a respective coincident outer edge of the distribution head to form a seal, and the lid includes means for connecting suction or pressuring means to the recovery chamber and the pressure chamber respectively.

28. A powdery material removal and recovery apparatus comprising a distribution head having vacuum means for drawing material through a bottom opening from a surface by suction and for transferring the material to a recovery chamber and onwards to a recovery hopper and an air distribution means for directing air onto the surface via a pressure chamber having a bottom opening to assist in the removal of the powdery material by the vacuum means, and a removable lid that comprises a depending skirt around its edges that forms a lip so that when positioned on the distribution head, an inner surface of the lip contacts a respective coincident outer edge of the distribution head to form a seal, and the lid includes means for connecting suction or pressuring means to the recovery chamber and the pressure chamber respectively.

29. The powdery material removal and recovery apparatus as recited in claim 28, wherein the distribution head comprises a boxed channel section with sealed edges.

30. The powdery material removal and recovery apparatus as recited in claim 28, further comprising a baffle extending from a position level with an upper edge of a top opening to a position level with a lower edge of a bottom opening of said distribution head to form the recovery chamber and the pressure chamber in the distribution head.

31. The powdery material removal and recovery apparatus as recited in claim 28, further comprising an adjustable bracket to which the distribution head mounts, the adjustable bracket operable to allow altering a clearance between the distribution head and the surface.

\* \* \* \* \*